(12) United States Patent
Matsushita et al.

(10) Patent No.: US 8,342,053 B2
(45) Date of Patent: Jan. 1, 2013

(54) OPERATING DEVICE FOR MANUAL TRANSMISSION APPARATUS

(75) Inventors: Ryuichi Matsushita, Nukata-gun (JP); Kazuo Yoshida, Ena (JP); Ryuji Honma, Nishio (JP); Yoshinori Nishi, Anjo (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 515 days.

(21) Appl. No.: 12/481,150

(22) Filed: Jun. 9, 2009

(65) Prior Publication Data
US 2009/0301250 A1 Dec. 10, 2009

(30) Foreign Application Priority Data

Jun. 9, 2008 (JP) ................................. 2008-150602

(51) Int. Cl.
*F16H 59/04* (2006.01)
*F16H 63/32* (2006.01)

(52) U.S. Cl. .................................. 74/473.36; 74/473.37

(58) Field of Classification Search .................... 74/335, 74/473.1, 473.12, 473.3, 473.36, 473.37
See application file for complete search history.

(56) References Cited

U.S. PATENT DOCUMENTS

| 5,522,279 | A | * | 6/1996 | Kataumi | 74/473.3 |
| 5,722,296 | A | * | 3/1998 | Nishigai et al. | 74/473.3 |
| 2006/0169083 | A1 | * | 8/2006 | Matsuda | 74/473.1 |
| 2007/0151386 | A1 | | 7/2007 | Englund et al. | |
| 2008/0087120 | A1 | | 4/2008 | Nakane et al. | |
| 2009/0241713 | A1 | * | 10/2009 | Ito et al. | 74/473.1 |

FOREIGN PATENT DOCUMENTS

| DE | 102 10 972 A1 | 10/2003 |
| EP | 1 091 149 A2 | 4/2001 |
| EP | 1 717 490 A2 | 11/2006 |
| JP | 2003-106449 A | 4/2003 |
| JP | 2006-308018 A | 11/2006 |
| JP | 2008-32158 | 2/2008 |

OTHER PUBLICATIONS

European Search Report issued Aug. 11, 2009 in corresponding European Patent Application No. 09007540.9.
Copending Application, entitled "Operating Device For Manual Transmission Apparatus" naming Ryuichi Matsushita, Kazuo Yoshida and Tetsuzou Yoneda as inventors, filed on Jun. 9, 2009.
Japanese Office Action issued Apr. 24, 2012 by the Japanese Patent office in Japanese Patent Application No. 2008-150602 and partial English translation of Office Action.

* cited by examiner

*Primary Examiner* — Justin Krause
*Assistant Examiner* — Adam D Rogers
(74) *Attorney, Agent, or Firm* — Buchanan Ingersoll & Rooney PC

(57) ABSTRACT

An operating device for a manual transmission apparatus includes: a plurality of operation shafts, supported at a housing to move in an axial direction thereof and selectively engaging one of a plurality of shift gear sets by one of the plurality of the operation shafts being moved in the axial direction thereof; a shift-and-select shaft, supported at the housing, selecting one of the plurality of the operation shafts by rotating in a circumferential direction of the shift-and-select shaft and moving the selected operation shaft in the axial direction of the selected operation shaft by moving in the axial direction of the shift-and-select shaft; an operating portion for manually operating the shift-and-select shaft; and an inertia unit, including an engagement portion, which is engageable with the shift-and-select shaft, pivotably supported at the housing, and pivoting in response to a movement of the shift-and-select shaft in the axial direction thereof.

6 Claims, 4 Drawing Sheets

OPERATING DEVICE FOR MANUAL TRANSMISSION APPARATUS

CROSS REFERENCE TO RELATED APPLICATIONS

This application is based on and claims priority under 35 U.S.C. §119 to Japanese Patent Application 2008-150602, filed on Jun. 9, 2008, the entire contents of which is incorporated herein by reference.

FIELD OF THE INVENTION

The present invention generally relates to an operating device for a manual transmission apparatus adapted to a vehicle and the like.

BACKGROUND

Generally, shift gear sets are provided to a synchromesh-type manual transmission apparatus in order to configure four to seven forward shift stages. Each of the shift gear sets is selectively engaged by means of a synchromesh mechanism. An operating device for performing a shift operation of the manual transmission apparatus includes fork shafts, each of which operates the corresponding synchromesh mechanism, a shift-and-select shaft for selecting and driving one of the fork shafts, a gear lever, which is operated by a driver, and an operation force transmitting mechanism for transmitting an operation force applied to the gear lever to the shift-and-select shaft. Generally, the shift-and-select shaft is configured so as to rotate in a circumferential direction and so as to move in an axial direction thereof. In a case where the shift-and-select shaft rotates in the circumferential direction thereof in order to select one of the fork shafts (a select operation), the shift-and-select shaft moves in the axial direction thereof in order to move the selected fork shaft in an axial direction thereof (a shift operation). On the other hand, in a case where the shift-and-select shaft moves in the axial direction thereof in order to select one of the fork shafts (a select operation), the shift-and-select shaft rotates in the circumferential direction thereof in order to move the selected fork shaft in an axial direction thereof (a shift operation). In the synchromesh mechanism, which corresponds to the selected fork shaft (a selected gear stage), when a sleeve of the selected synchromesh mechanism is shift-operated by the selected fork shaft, the synchronizer ring (an input side portion) and the selected gear (an output side portion) are frictionally engaged by an inner slide mechanism of the synchromesh mechanism, thereby synchronizing a rotation of the selected gear and a rotation of an output side shaft of the manual transmission apparatus. Accordingly, the sleeve and the selected gear are fittedly connected by an engaging mechanism of the synchromesh mechanism via the synchronizer ring and the selected shift stage is established. The operation force necessary in a process of the shift operation of the synchromesh mechanism is not constant. Furthermore, a reaction force may be generated when the synchronizer ring is frictionally engaged with the selected gear or when the synchronizer ring is fittedly connected with the selected gear, and such reaction force may be transmitted to the gear lever.

A demand for improving a shift feeling when performing the shift operation by controlling changes in the operation force or the reaction force of the synchromesh mechanism is increased. A shift device of a manual transmission apparatus for a vehicle, which is disclosed in JP2003-106449A, attempts to improve the shift feeling by using inertial action, which is generated when pivoting an outer lever, which pivots around a shift-and-select shaft and to which an inertia lever and an inertia mass are provided. Furthermore, according to a shift mechanism for a manual transmission apparatus, which is disclosed in JP2008-32158A, an inertia mass is configured so as to be relatively displaced on an inertia lever, which pivots around a shift-and-select shaft, so that an inertia generated when a shift operation is performed by a driver is increased and the inertia when the shift operation is not performed by the driver is decreased, in order to decrease vibration transmitted to a gear lever.

Further, in order to enhance inertial action when a shift-and-select shaft is moved in an axial direction, an inertia mass is attached and fixed at the shift-and-select shaft itself.

However, the shift device disclosed in JP2003-106449A and the shift mechanism disclosed in JP2008-32158A are adaptable to an operating device for a manual transmission apparatus, which is configured to shift-operate a fork shaft by rotating the shift-and-select shaft in a circumferential direction thereof. Therefore, the shift device disclosed in JP2003-106449A and the shift mechanism disclosed in JP2008-32158A are not adaptable to an operating device for a manual transmission apparatus, which is configured to shift-operate the fork shaft by moving the shift-and-select shaft in an axial direction thereof.

Further, in the configuration, in which the inertia mass is attached and fixed at the shift-and-select shaft itself, a mass of sufficient weight is not easily provided because an inside space of a manual transmission apparatus is not enough to accommodate the mass. Furthermore, the inertia mass acts in accordance with both a rotation of the shift-and-select shaft in a circumferential direction thereof and a movement the shift-and-select shaft in the axial direction thereof. Therefore, a select feeling at the time of select operation, in which the appropriate fork shaft is selected, may be deteriorated.

A need thus exists to provide an operating device for a manual transmission apparatus which is not susceptible to the drawback mentioned above.

SUMMARY OF THE INVENTION

According to an aspect of the present invention, an operating device for a manual transmission apparatus includes: a plurality of operation shafts, supported at a housing so as to move in an axial direction thereof and selectively engaging one of a plurality of shift gear sets by one of the plurality of the operation shafts being moved in the axial direction thereof; a shift-and-select shaft, supported at the housing, selecting one of the plurality of the operation shafts by rotating in a circumferential direction of the shift-and-select shaft and moving the selected operation shaft in the axial direction of the selected operation shaft by moving in the axial direction of the shift-and-select shaft; an operating portion for manually operating the shift-and-select shaft; and an inertia unit including an engagement portion, which is engageable with the shift-and-select shaft, at an end portion of the inertia unit, pivotably supported at the housing, and pivoting in response to a movement of the shift-and-select shaft in the axial direction thereof.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
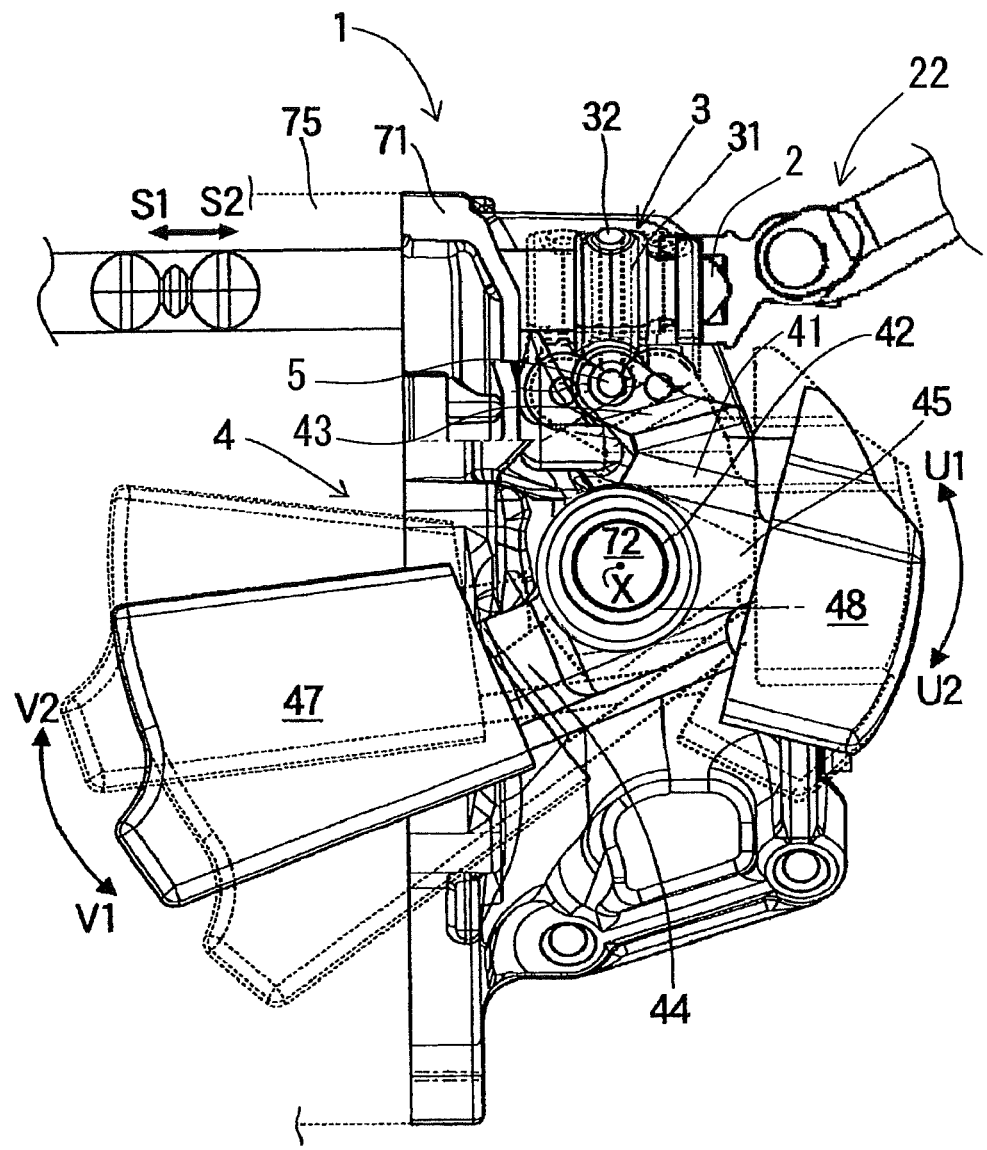
FIG. 1 is a diagram illustrating an operating device for a manual transmission apparatus according to an embodiment when being viewed from a side of the transmission apparatus.
Figure 2:
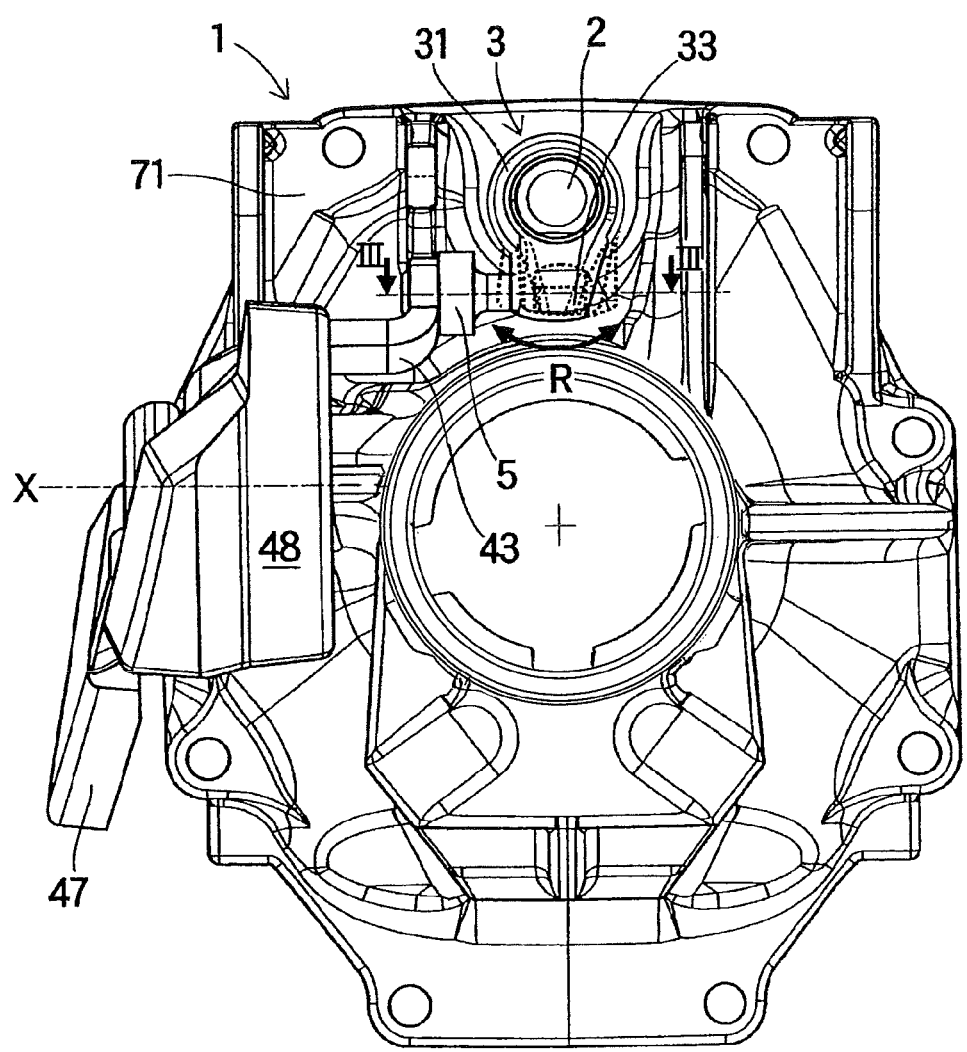
FIG. 2 is a diagram illustrating the operating device according to the embodiment shown in FIG. 1 when being viewed from a back side (i.e. from a right side of FIG. 1) of the transmission apparatus.
Figure 3:
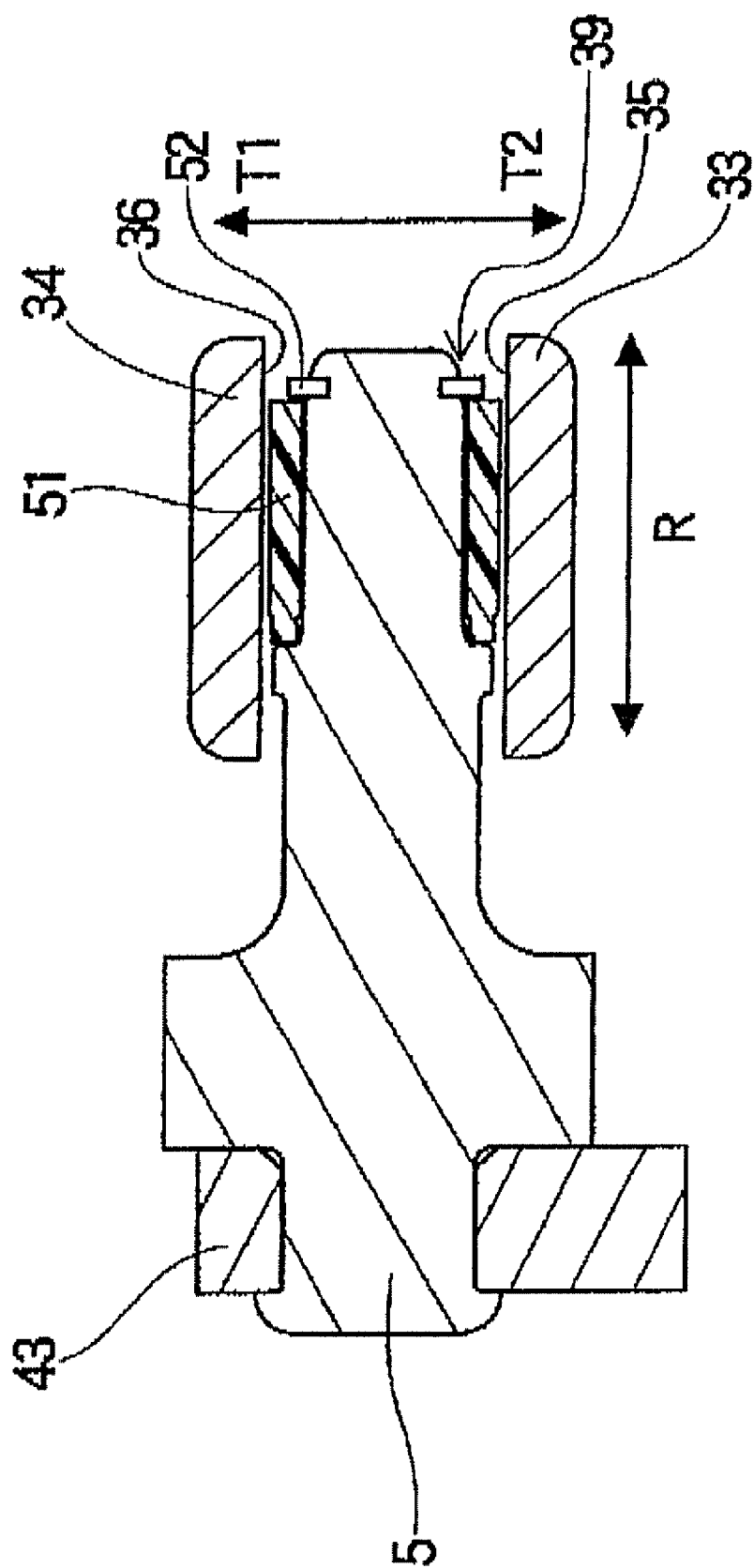
FIG. 3 is a cross-sectional view illustrating an engagement groove of a shift-and-select shaft and an engagement pin of an inertia unit, taken along line III-III in FIG. 2.

An embodiment of an operating device adapted to, for example, a manual transmission apparatus will be described in accordance with FIGS. 1 to 3 of the attached drawings. Illustrated in FIG. 1 is a diagram of an operating device 1 for a manual transmission apparatus when being viewed from a side of the transmission apparatus. Illustrated in FIG. 2 is the operating device 1 when being viewed from a back side (i.e. from a right side of FIG. 1) of the transmission apparatus. Illustrated in FIG. 3 is a cross-sectional view illustrating an engagement groove 39 of a shift-and-select shaft 2 and an engagement pin 5 of an inertia unit 4, taken along line III-III in FIG. 2. The operating device 1 for the manual transmission apparatus according to the embodiment includes the shift-and-select shaft 2, the inertia unit 4, three fork shafts 12 (operation shafts), and an operating portion 22. A solid line in FIG. 1 indicates a case where the shift-and-select shaft 2 is in a neutral position, i.e. a case where the shift-and-select shaft 2 does not move either to the right or left in FIG. 1. A dashed line in FIG. 1 indicates a case where the shift-and-select shaft 2 is moved to the right and left in an axial direction thereof.

The shift-and-select shaft 2 is axially supported at an upper portion of the transmission apparatus therewithin by an extension housing 71 (a housing) provided at a back portion (i.e. a right side of FIG. 1) of the transmission apparatus and a housing main body 75 (a housing), whose portion is illustrated by a dashed line in FIG. 1, so that the shift-and-select shaft 2 is rotatable in a circumferential direction thereof and so as to be movable in the axial direction thereof. As illustrated in FIG. 1, a support member 3 is integrally provided on a circumferential surface of the shift-and-select shaft 2 at a portion thereof outwardly extending to the right in FIG. 1 from the extension housing 71. As illustrated in FIGS. 2 and 3, the support member 3 includes a cylindrical portion 31 surrounding the shift-and-select shaft 2 and two plate-shaped groove forming portions 33 and 34, which are provided at the cylindrical portion 31 so as to downwardly extend therefrom in FIG. 2 in parallel with each other. The cylindrical portion 31 is fixed on the shift-and-select shaft 2 by means of a pin, which is screwed or press-fitted in an attachment hole 32 provided at a top portion of the cylindrical portion 31. Furthermore, as illustrated in FIG. 3, the two groove forming portions 33 and 34 are provided at the cylindrical portion 31 in parallel with each other so as to be orthogonal to an axis of the shift-and-select shaft 2, so that the engagement groove 39 is formed between the groove forming portions 33 and 34 so as to extend in the circumferential direction of the shift-and-select shaft 2. Additionally, the first and second groove forming portions 33 and 34 include first and second inner surfaces 35 and 36, respectively, so that the first and second inner surfaces 35 and 36 face one another. Furthermore, the first and second inner surfaces 35 and 36 define the engagement groove 39, i.e. the first and second inner surfaces 35 and 36 also refer to inner surfaces of the engagement groove 39.

Figure 4:
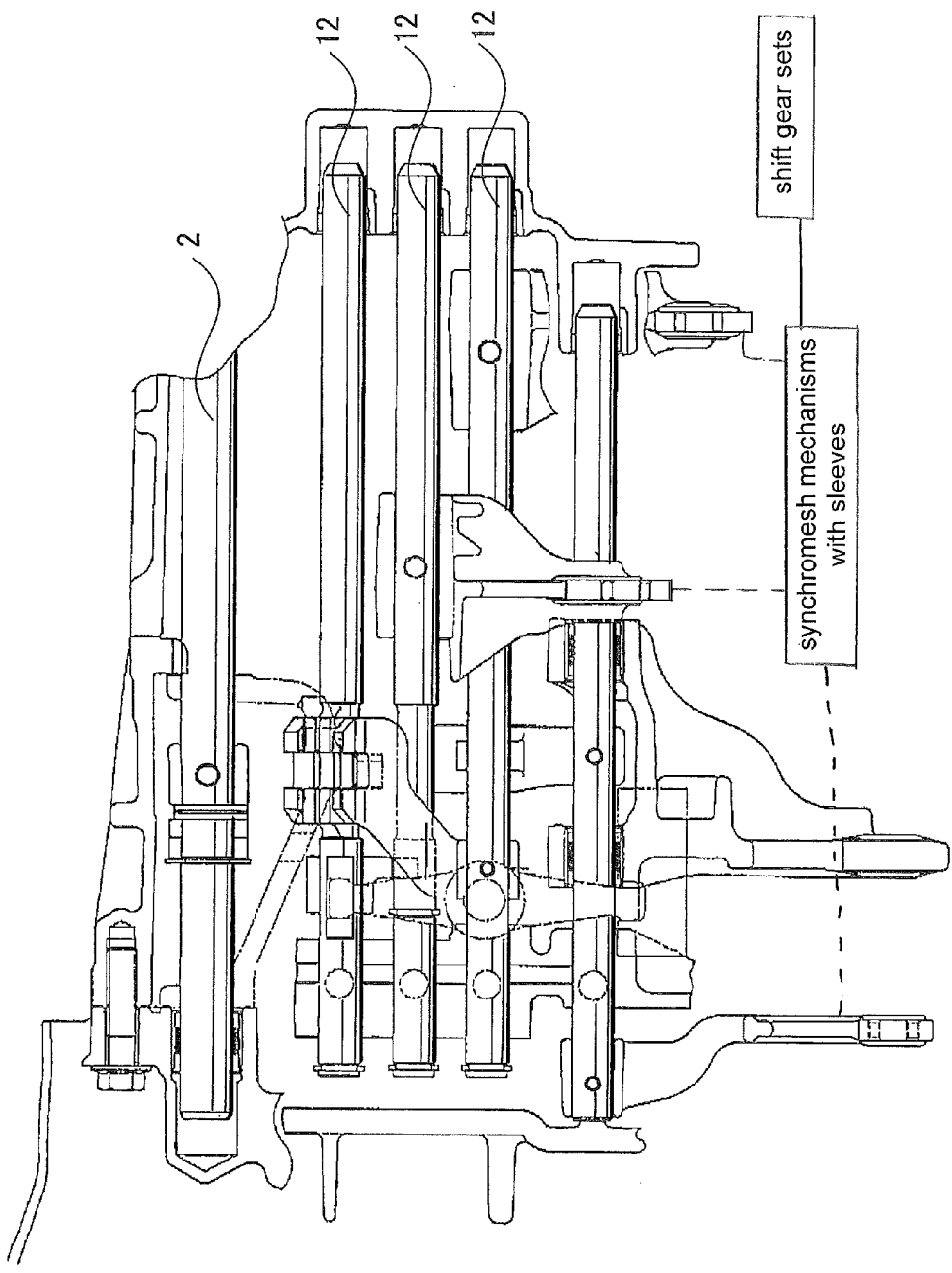
FIG. 4 is a partial cross-sectional diagram illustrating a configuration example of the manual transmission apparatus when being viewed from a side thereof.

An inner lever is provided at an extended portion of the shift-and-select shaft 2 at the left side in FIG. 1. Three fork shafts 12 (see FIG. 4) are provided at the inner lever so as to be engageable/disengageable. The three fork shafts 12 are supported at the housing main body 75 so as to be movable in an axial direction of each fork shaft 12, so that sleeves of synchromesh mechanisms are shift-operated by movement of the corresponding fork shafts 12 in the axial direction thereof.

Further, the shift-and-select shaft 2 is configured so as to be operated by the operating portion 22. The operating portion 22 is configured with an operation lever, by which a driver performs an operation, and an operation cable, which transmits an operation force applied to the operation lever to the shift-and-select shaft 2. When the operating portion 22 rotates the shift-and-select shaft 2 in the circumferential direction thereof, the inner lever engages with one of three fork shafts 12 so as to perform a select operation. Furthermore, when the operating portion 22 moves the shift-and-select shaft 2 to the right or left in FIG. 1 in the axial direction thereof, the inner lever shift-operates the engaged fork shaft 12 to the right or left in response to the movement of the shift-and-select shaft 2.

As illustrated in FIG. 1, the inertia unit 4 is pivotably supported at an outer side surface of the extension housing 71 substantially at a middle position between upper and lower ends of the extension housing 71 in FIG. 1. The inertia unit 4 includes an inertia unit main body 41, first and second inertia masses 47 and 48 and the engagement pin 5 (an engagement portion). As illustrated in FIG. 1, the inertia unit main body 41 includes a hole 42 (a pivotably supported portion) at a substantially middle portion thereof, an engagement arm portion 43, which is provided so as to upwardly extend in FIG. 1 from the hole 42 in a radial direction of the hole 42, a first inertia arm portion 44, which is provided so as to extend towards a lower left side in FIG. 1 from the hole 42 in the radial direction of the hole 42, and a second inertia arm portion 45, which is provided so as to extend towards the right in FIG. 1 from the hole 42 in the radial direction of the hole 42. A pivot boss 72, which is provided at the extension housing 71 so as to protrude therefrom, is inserted into the hole 42, so that the inertia unit 4 is pivotably supported by the extension housing 71. In other words, the inertia unit 4 is supported by the extension housing 71 so as to pivot (rotate) in a clockwise direction and a counterclockwise direction in FIG. 1 around a pivot axis X at a center portion of the pivot boss 72.

A portion where the inertia unit 4 is pivotably supported by the extension housing 71 serves as a pivotably supported portion. Further, an axis of the portion where the inertia unit 4 is pivotably supported by the extension housing 71 serves as a pivotably support axis around which the inertia unit 4 pivots.

The first inertia mass 47, which is formed in a block shape, is fixed at an edge portion of the first inertia arm 44. Similarly, the second inertia mass 48, which is formed in a block shape, is fixed at an edge portion of the second inertia arm 45. The inertia unit 4 includes moment of inertia centered around the pivot axis X, as is evident from the mechanical dynamics. The first and second inertia arm portions 44 and 45 and the first and second inertia masses 47 and 48 largely increase the moment of inertia, thereby increasing an inertial action. A center of gravity of the inertia unit 4 is set at a position vertically lower than the pivot axis X in a state where the shift-and-select shaft 2 is in a neutral position as illustrated in FIG. 1.

As illustrated in FIG. 2, the engagement arm portion 43 forms a curving shape so as to upwardly extend in FIG. 2. The engagement pin 5 is integrally provided at an upper end portion of the engagement arm portion 43. The engagement pin 5 is provided at the upper end portion of the engagement arm portion 43 so as to extend in a right-and-left direction in FIG. 2 (i.e. so that a longitudinal direction of the engagement pin 5 corresponds to the right-and-left direction in FIG. 2). Further, as illustrated in FIG. 3, slightly less than half length of the engagement pin 5 is positioned within the engagement groove 39, which is formed between the groove forming portions 33 and 34. Furthermore, a resin-made cylindrical-shaped ring 51 is idly rotatably provided at a portion where the engagement pin 5 faces the first and second inner surfaces 35 and 36 of the engagement groove 39, by using a washer 52. When the groove forming portions 33 and 34 are moved in an upper-lower direction in FIG. 3, the first and second inner surfaces 35 and 36 thrust the ring 51.

An operation of the operating device 1 for the manual transmission apparatus according to the embodiment will be described below.

In the neutral position shown in FIG. 1, the center of gravity of the inertia unit 4 is set at the position vertically lower than the pivot axis X, and a weight of the inertia unit 4 is supported by the pivot boss 72. Therefore, a load is not generated between the ring 51 and each of the first and second inner surfaces 35 and 36 of the engagement groove 39. When the driver starts the shift operation while the shift-and-select shaft 2 is at the neutral position as illustrated in FIG. 1, the shift-and-select shaft 2 rotates in the circumferential direction thereof in order to select one of the fork shafts 12 (the select operation). While the select operation is being performed, the support member 3 pivots in response to the movement of the shift-and-select shaft 2, as indicated by an arrow R in FIGS. 2 and 3. The support member 3 pivots so that the first or second inner surfaces 35 and 36 of the engagement groove 39 moves relative to the ring 51 so as not to contact the ring 51. Therefore, the engagement pin 5 does not move and the inertia unit 4 does not pivot. In other words, the inertia unit 4 is not involved in the select operation, therefore, the inertia unit 4 does not deteriorate a feeling felt by a driver when the select operation is being performed (i.e. a select feeling).

Following the select operation, the shift-and-select shaft 2 moves to the right or left in the axial direction thereof in FIG. 1, as indicated by arrows S1-S2, in order to shift the selected fork shaft 12 (i.e. the shift operation). When the shift operation is being performed, the support member 3 moves in a direction indicated by an arrow T1 in FIG. 3, so that the first inner surface 35 of the engagement groove 39 thrusts the ring 51, thereby moving the engagement pin 5. Alternatively, when the shift operation is being performed, the support member 3 moves in a direction indicated by an arrows T2 in FIG. 3, so that the second inner surface 36 of the engagement groove 39 thrusts the ring 51, thereby moving the engagement pin 5. Accordingly, the engagement arm portion 43 of the inertia unit 4 is operated, so that the entire inertia unit 4 pivots as indicated by arrows U1-U2 and V1-V2 in FIG. 1. The operation force necessary when the shift operation is started is set to be a sum of a force necessary for the shift-and-select shaft 2 and for the fork shafts 12 start being moved in the axial direction, and a force necessary for the inertia unit 4 starts being moved so as to resist the inertia moment.

In accordance with a progress of the shift operation, the sleeve of the corresponding synchromesh mechanism is operated by the corresponding fork shaft 12 so that a synchronizer ring (an input side portion) and the selected gear (an output side portion) are frictionally engaged by an inner slide mechanism of the synchromesh mechanism, thereby synchronizing a rotation of the selected gear and a rotation of an output side shaft of the manual transmission apparatus. Accordingly, the sleeve and the selected gear are connected by an engaging mechanism of the synchromesh mechanism via the synchronizer ring and the selected shift stage is established. The operation force and a reaction force, necessary when the synchronizer ring is frictionally engaged with the selected gear or when the synchronizer ring is fittedly connected with the selected gear, are changed continuously. When the operation force and the reaction force are changed continuously, impetus, generated when the inertia unit 4 pivots, absorbs the changes in the operation force and the reaction force. Therefore, the changes in the operation force applied by the driver are reduced, which may result in smoothing the shift operation, thereby enhancing a feeling felt by the driver when the shift operation is performed (i.e. the shift feeling).

The engagement groove 39 of the support member 3 is moved in a straight manner along the shift-and-select shaft 2, and the engagement pin 5 is pivotally moved around the pivot axis X. Therefore, in a configuration where the ring 51 is not provided, an engagement pin 5 and each of the first and second infer surface 35 and 36 of the engagement groove 39 contact each other so as to generate a friction by a slide movement therebetween. In a configuration where the ring 51 is provided, the engagement pin 5 and each of the first and second inner surfaces 35 and 36 contact each other so as to generate a friction by a rolling movement therebetween, and accordingly, attrition at contacting surfaces between the engagement pin 5 and each of the first and second inner surfaces 35 and 36 of the engagement groove 39 is reduced.

Accordingly, when the driver performs the shift operation, the shift-and-select shaft 2 first rotates in the circumferential direction thereof in order to select one of the fork shafts 12 (the select operation), and then the shift-and-select shaft 2 moves in the axial direction thereof in order to shift the selected fork shaft 12 (the shift operation). The shift-operated fork shaft 12 selectively engages the gear set, and the operation force and the opposite reaction force, required when the shift operation is performed, are changed according to time progress. On the other hand, the inertia unit 4, engaged with the shift-and-select shaft 2, pivots in response to the movement of the shift-and-select shaft 2 in the axial direction thereof. In other words, the shift operation of the fork shaft 12 and the pivot of the inertia unit 4 are performed simultaneously. The inertia unit 4 is pivotably supported at the extension housing 71, and includes the moment of inertia centered around the hole 42, where the inertia unit 4 is pivotably supported by means of the extension housing 71. Therefore, the pivot of the inertia unit 4 applies an inertial action to the movement of the shift-and-select shaft 2 in the axial direction and the shift operation of each of the fork shaft 12. In other words, impetus, generated when the inertia unit 4 pivots, absorbs the changes in the operation force and the reaction force. Therefore, the changes in the operation force applied by the driver are reduced, which may result in smoothing the shift operation, thereby enhancing the shift feeling.

Accordingly, the inertia unit 4, which is engaged with the shift-and-select shaft 2, is provided so that the shift operation of the fork shafts 12 and the pivotal movement of the inertia unit 4 are simultaneously preformed by the movement of the shift-and-select shaft 2 in the axial direction thereof. Accordingly, the changes in the operation force and the reaction are absorbed by the inertial action generated when the inertia unit 4 pivots, thereby smoothing the shift operation performed by the driver and enhancing the shift feeling.

According to the embodiment, the inertia unit 4 includes one or more inertia arm portions 43 and 44, extending from the hole 42, where the inertia unit 4 is pivotably supported, in the radial direction of the hole 42.

Accordingly, one or more the inertia arm portions 43 and 44, extending from the hole 42 in the radial direction thereof, is provided. Further, the first and second inertia masses 47 and 48 may be integrally provided at the first and second inertia arm portions 44 and 45, respectively. Shapes and weights of the first and second inertia masses 47 and 48 and the first and second inertia arm portions 44 and 45 are appropriately set so that the moment of inertia centered around the hole 42 is set to an appropriate amount, which meets the changes in the operation force and the reaction force.

According to the embodiment, the center of gravity of the inertia unit 4 is set at the position vertically lower than the pivot axis X of the hole 42 where the inertia unit 4 is pivotably supported, in a state where the fork shaft 12 selected by the shift-and-select shaft 2 is positioned in a neutral position where the selected fork shaft 12 is not moved in the axial direction thereof.

Accordingly, when the shift-and-select shaft 2 is positioned in the neutral position, the weight of the inertia unit 4 is supported at the hole 42, and the weight of the inertia unit 4 is not applied to the shift-and-select shaft 2. Therefore, the weight of the inertia unit 4 does not interfere the select operation when the shift operation is stated. On the other hand, in a case where a center of gravity of an inertia unit is displaced from the position vertically lower than a point where the inertia unit is pivotally supported, part of a weight of the inertia unit is applied to a shift-and-select shaft positioned in a neutral position. Therefore, an additional operation force may be required when the shift operation is started.

According to the embodiment, the shift-and-select shaft 2 includes the engagement groove 39, extending in the circumferential direction of the shift-and-select shaft 2, in a vicinity of an outer circumference thereof, the engagement pin 5 of the inertia unit 4 is positioned within the engagement groove 39, the engagement groove 39 is moved relative to the engagement pin 5 along the engagement pin 5 in response to a rotation of the shift-and-select shaft 2 in the circumferential direction thereof, and the engagement pin 5 is moved in a manner where the engagement pin 5 is engaged with the engagement groove 39 in response to the movement of the shift-and-select shaft 2 in the axial direction thereof.

Accordingly, when the shift-and-select shaft 2 rotates in the circumferential direction thereof, the first or second inner surfaces 35 and 36 of the engagement groove 39 moves relative to the engagement pin 5 so as not to contact the engagement pin 5, and therefore, the engagement pin 5 does not move. On the other hand, when the shift-and-select shaft 2 is moved in the axial direction thereof, one of the first and second inner surfaces 35 and 36 of the engagement groove 39 thrusts the engagement pin 5 so as to move the engagement pin 5 in the axial direction of the shift-and-select shaft 2. Therefore, the inertia unit 4 is not involved in the select operation, and the inertia unit 4 pivots only when the shift operation is performed, thereby preventing deteriorating the select feeling, and as a result, improving the shift feeling.

Accordingly, in a configuration where the engagement groove 39 is provided with the shift-and-select shaft 2 and the engagement pin 5 of the inertia unit 4 is positioned within the engagement groove 39, the inertia unit 4 pivots only when the shift-and-select shaft 2 moves in the axial direction thereof, and the inertia unit 4 does not pivot when the shift-and-select shaft 2 rotates in the circumferential direction thereof. Therefore, the inertia unit 4 produces an effect of the inertial action when the shift operation is performed, so as to enhance the shift feeling. On the other hand, the inertia unit 4 is not involved with the select operation, so as not to deteriorate the select feeling.

According to the embodiment, the engagement pin 5 of the inertia unit 4 includes the ring 51 selectively contacting the first inner surface 35 or the second inner surface 36 of the engagement groove 39 of the shift-and-select shaft 2 and provided to be idly pivotable.

Accordingly, when the engagement groove 39 of the shift-and-select shaft 2 moves in the axial direction of the shift-and-select shaft 2 so as to move the engagement pin 5, the engagement pin 5 and each of the first and second infer surfaces 35 and 36 of the engagement groove 39 do not contact each other so as to generate the friction by the slide movement therebetween, but contact each other so as to generate the friction by the rolling movement therebetween. Therefore, attrition at contacting surfaces between the engagement pin 5 and each of the first and second inner surfaces 35 and 36 of the engagement groove 39 is reduced.

According to the embodiment, the plurality of the operation shafts 12 are fork shafts for operating sleeves of corresponding synchromesh mechanisms, respectively.

Accordingly, the embodiment may be adapted to a synchromesh manual transmission apparatus for selectively engaging a gear set by means of a synchromesh mechanism so as to obtain significant performance. However, the embodiment is not limited to be adapted to the synchromesh manual transmission apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An operating device for a manual transmission apparatus, comprising:
   a plurality of axially movable operation shafts supported at a housing and selectively engageable with one of a plurality of shift gear sets;
   a shift-and-select shaft supported at the housing, selecting one of the plurality of operation shafts by rotating in a circumferential direction of the shift-and-select shaft and moving the selected operation shaft in an axial direction of the selected operation shaft by moving in an axial direction of the shift-and-select shaft;
   an engagement groove extending in the circumferential direction of the shift-and-select shaft at an outer circumference of the shift-and-select shaft, the engagement groove including a first inner surface and a second inner surface;
   an operating portion for manually operating the shift-and-select shaft;
   an inertia unit possessing a first end portion at which is located a pivotably supported portion which is pivotably supported at the housing so that the inertia unit is pivotable in response to movement of the shift-and-select shaft in the axial direction of the shift-and-select shaft, the inertia unit also including a second end portion at which is located an engagement portion;

the engagement portion including a projecting pin and a ring idly pivotably mounted on the projecting pin, the projecting pin and the ring being positioned in the engagement groove, and the ring being selectively contactable with the first inner surface or the second inner surface of the engagement groove; and the engagement groove being movable relative to the engagement portion along the engagement portion in response to rotation of the shift-and-select shaft in the circumferential direction, and the engagement portion being movable in a manner in which the ring engages one of the first and second inner surfaces of the engagement groove in response to axial movement of the shift-and-select shaft.

2. The operating device for the manual transmission apparatus according to claim 1, wherein the inertia unit includes at least one inertia arm portion extending from the pivotably supported portion.

3. The operating device for the manual transmission apparatus according to claim 1, wherein the inertia unit includes a plurality of inertia arm portions extending from the pivotably supported portion.

4. The operating device for the manual transmission apparatus according to claim 1, wherein the inertia unit is pivotably supported in a radial direction of the pivotably supported portion.

5. The operating device for the manual transmission apparatus according to claim 1, wherein a center of gravity of the inertia unit is vertically below a pivot axis of the pivotably supported portion when the operation shaft selected by the shift-and-select shaft is positioned in a neutral position at which the selected operation shaft is not axially moved.

6. The operating device for the manual transmission apparatus according to claim 1, wherein the plurality of operation shafts are fork shafts for operating sleeves of corresponding synchromesh mechanisms, respectively.

* * * * *